(12) United States Patent
Tripathi et al.

(10) Patent No.: US 12,392,371 B2
(45) Date of Patent: Aug. 19, 2025

(54) AIR TURBINE STARTER WITH FLUID DAMPING ASSEMBLY

(71) Applicant: Unison Industries, LLC, Jacksonville, FL (US)

(72) Inventors: Pallavi Tripathi, Bengaluru (IN); Sharad Pundlik Patil, Bengaluru (IN); Narendra Dev Mahadevaiah, Bengaluru (IN); Ravindra Shankar Ganiger, Bengaluru (IN); Shiloh Montegomery Meyers, Miamisburg, OH (US)

(73) Assignee: Unison Industries, LLC, Jacksonville, FL (US)

( * ) Notice: Subject to any disclaimer, the term of this patent is extended or adjusted under 35 U.S.C. 154(b) by 15 days.

(21) Appl. No.: 18/354,984

(22) Filed: Jul. 19, 2023

(65) Prior Publication Data

US 2025/0027534 A1 Jan. 23, 2025

(51) Int. Cl.
| | |
|---|---|
| *F16C 27/04* | (2006.01) |
| *F01D 25/16* | (2006.01) |
| *F02C 7/06* | (2006.01) |
| *F02C 7/277* | (2006.01) |
| *F16F 15/16* | (2006.01) |

(52) U.S. Cl.
CPC .......... *F16C 27/045* (2013.01); *F01D 25/164* (2013.01); *F02C 7/06* (2013.01); *F02C 7/277* (2013.01); *F16F 15/161* (2013.01); *F05D 2240/54* (2013.01); *F05D 2260/85* (2013.01); *F05D 2260/96* (2013.01); *F16C 2360/23* (2013.01)

(58) Field of Classification Search
CPC ..... F02C 7/277; F16F 15/161; F16F 15/2037; F01D 25/164; F01D 25/183; F16C 27/00
See application file for complete search history.

(56) References Cited

U.S. PATENT DOCUMENTS

| | | | | |
|---|---|---|---|---|
| 4,440,456 A | * | 4/1984 | Klusman ............... | F16C 27/045 384/582 |
| 4,527,910 A | * | 7/1985 | Fleming ................ | F01D 25/164 384/101 |
| 4,669,893 A | * | 6/1987 | Chalaire ............... | F16C 27/045 384/535 |

(Continued)

FOREIGN PATENT DOCUMENTS

| | | |
|---|---|---|
| EP | 0890781 B1 | 1/1999 |
| EP | 3957841 A1 | 2/2022 |

(Continued)

*Primary Examiner* — Topaz L. Elliott
(74) *Attorney, Agent, or Firm* — McGarry Bair PC (57) ABSTRACT

An air turbine starter for starting an engine having a housing that defines an inlet, an outlet, and an air flow path extending between the inlet and the outlet. The housing includes a seal that defines at least a portion of the air flow path. A drive shaft rotatably coupled to a turbine defines a rotating axis. The turbine includes circumferentially spaced blades at least partially disposed within the air flow path. At least one bearing rotatably supports the drive shaft. A bearing support structure is located between the at least one bearing and the seal. A fluid damping assembly includes one or more conduits that fluidly couple a fluid source to a fluid reservoir.

19 Claims, 4 Drawing Sheets

(56) References Cited

U.S. PATENT DOCUMENTS

| | | | | |
|---|---|---|---|---|
| 4,782,919 A | * | 11/1988 | Chalaire | F16F 15/0237 188/266 |
| 5,110,257 A | * | 5/1992 | Hibner | F16C 27/045 415/119 |
| 6,065,932 A | | 5/2000 | Dodd | |
| 7,384,199 B2 | | 6/2008 | Allmon et al. | |
| 8,727,632 B2 | | 5/2014 | Do et al. | |
| 9,500,100 B2 | | 11/2016 | Carter et al. | |
| 9,599,152 B2 | | 3/2017 | Freeman et al. | |
| 9,677,659 B1 | | 6/2017 | Niergarth et al. | |
| 9,702,404 B2 | * | 7/2017 | Smedresman | F16C 27/045 |
| 9,869,205 B2 | | 1/2018 | Ganiger et al. | |
| 10,001,028 B2 | | 6/2018 | Ganiger et al. | |
| 10,316,756 B2 | | 6/2019 | Gentile et al. | |
| 10,323,541 B2 | | 6/2019 | Ganiger et al. | |
| 10,358,942 B2 | | 7/2019 | Moniz et al. | |
| 10,794,222 B1 | * | 10/2020 | Ganiger | F16C 27/04 |
| 11,193,390 B2 | | 12/2021 | Ganiger et al. | |
| 11,203,980 B2 | | 12/2021 | Varote et al. | |
| 11,454,134 B2 | * | 9/2022 | Hopper | F01D 25/04 |
| 11,661,863 B2 | | 5/2023 | Kurvinkop | |
| 2004/0047731 A1 | * | 3/2004 | Hull | F16C 19/52 416/174 |
| 2007/0086685 A1 | * | 4/2007 | Klusman | F16C 27/045 384/99 |
| 2012/0118103 A1 | | 5/2012 | Blewett | |
| 2013/0108440 A1 | * | 5/2013 | Do | F01D 25/164 415/229 |
| 2014/0193245 A1 | * | 7/2014 | Morreale | F01D 1/04 415/170.1 |
| 2016/0160924 A1 | * | 6/2016 | Meyers | F16C 33/6659 384/474 |
| 2017/0122369 A1 | * | 5/2017 | Smedresman | F16C 27/045 |
| 2017/0307046 A1 | * | 10/2017 | Steen | F01D 25/164 |
| 2017/0363010 A1 | * | 12/2017 | Rodriguez | F16D 41/22 |
| 2018/0030900 A1 | | 2/2018 | Mathis | |
| 2019/0063261 A1 | * | 2/2019 | Varney | F16C 33/6659 |
| 2019/0178104 A1 | * | 6/2019 | Joshi | F01D 25/164 |
| 2019/0234239 A1 | * | 8/2019 | Tsujimoto | F02C 7/06 |
| 2021/0025290 A1 | * | 1/2021 | Ivakitch | F01D 25/164 |
| 2021/0047940 A1 | * | 2/2021 | Ganiger | F01D 25/162 |
| 2022/0042423 A1 | * | 2/2022 | Hopper | F01D 25/04 |
| 2022/0275831 A1 | * | 9/2022 | Cevik | F16F 15/0237 |
| 2024/0052890 A1 | * | 2/2024 | Tripathi | F02C 7/277 |

FOREIGN PATENT DOCUMENTS

| | | | |
|---|---|---|---|
| FR | 3106622 A1 | * | 7/2021 |
| GB | 927207 | | 5/1963 |
| JP | H09250654 A | | 9/1997 |

* cited by examiner

AIR TURBINE STARTER WITH FLUID DAMPING ASSEMBLY

TECHNICAL FIELD

The present subject matter relates generally to an air turbine starter, and more specifically to a fluid damping assembly in the air turbine starter.

BACKGROUND

An aircraft engine, for example a gas turbine engine, typically includes an air turbine starter for starting the gas turbine engine. The internal components of the air turbine starter require bearings. In the air turbine starter, the bearings transfer radial and axial loads during rotor operation. The air turbine starter bearings are typically sized and designed based on load input from rotor dynamics and axial thrust. During operation, the air turbine starter bearings typically experience high radial loads caused by rigid mounting.

DETAILED DESCRIPTION

The present disclosure is related to an air turbine starter ("ATS"), and, more specifically, a bearing support structure for an ATS. An ATS includes a turbine shaft supported by turbine bearings mounted on a turbine exhaust housing. The bearing support structure disclosed herein enables flexibility resulting in lower bearing loads, in turn elongating the life of the bearings and the bearing support structure. The flexibility provided by the bearing support structure disclosed herein can provide a structural flexibility to absorb radial loads, axial loads, or both the radial and axial loads. The ATS can have various applications including starting a gas turbine engine and generating electrical power when the gas turbine engine is in operation. While the exemplary embodiment described herein is directed to a bearing support structure for an ATS, embodiments of the disclosure can be applied to any implementation of support bearings for engine components.

A typical ATS has conventional turbine bearings with bearing sleeves that mount to a turbine housing via an interference fit to support turbine rotors. Turbine bearings transfer radial and axial loads from the turbine rotors during operation. Bearings are sized and designed to accommodate the rotor dynamics and axial thrust loads produced during operation. Due to the rigid mounting, bearings experience high radial loads at critical modes, which in turn influences the bearing life.

To enhance the bearing life, a soft-mount bearing arrangement incorporating flexibility in a bearing load path is described herein. The soft-mount bearing arrangement results in lower radial loads by shifting the critical mode to a lower speed, or revolutions per minute (RPM), for the rotor. The soft-mount bearing arrangement described in more detail herein enables flexibility in the bearing load path by utilizing low stiffness structure between the bearings through implementing flexible connectors. While the axial load does not change, the flexible connectors provide a shift of the natural frequency or critical mode to a portion of the operating range that are passed though rapidly. That is, the flexible connectors provide a shift of the natural frequency or critical mode away from "dwelling ranges," where the term "dwelling ranges" refers to a speed or range of speeds the ATS can pause or remain at during operation. In other words, the natural frequency or critical mode shifts to an operating speed that the ATS passes through rapidly, reducing the number of high reaction load cycles on the bearings. It is contemplated that the flexible connectors can provide a shift of the natural frequency, the critical mode, or at least a portion of the harmonics of the natural frequency beyond current operating ranges.

The word "exemplary" is used herein to mean "serving as an example, instance, or illustration." Any implementation described herein as "exemplary" is not necessarily to be construed as preferred or advantageous over other implementations. Additionally, unless specifically identified otherwise, all embodiments described herein should be considered exemplary.

As used herein, the terms such as "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

As used herein, the term "upstream" refers to a direction that is opposite the fluid flow direction, and the term "downstream" refers to a direction that is in the same direction as the fluid flow. The term "fore" or "forward" means in front of something and "aft" or "rearward" means behind something. For example, when used in terms of fluid flow, fore/forward can mean upstream and aft/rearward can mean downstream.

Additionally, as used herein, the terms "radial" or "radially" refer to a direction extending towards or away from a common center. For example, in the overall context of a turbine engine, radial refers to a direction along a ray extending between a center longitudinal axis of the turbine engine and an outer engine circumference. Furthermore, as used herein, the term "set" or a "set" of elements can be any number of elements, including only one.

All directional references (e.g., radial, axial, proximal, distal, upper, lower, upward, downward, left, right, lateral, front, back, top, bottom, above, below, vertical, horizontal, clockwise, counterclockwise, upstream, downstream, forward, aft, etc.) are only used for identification purposes to aid the reader's understanding of the present disclosure, and do not create limitations, particularly as to the position, orientation, or use of aspects of the disclosure described herein. Connection references (e.g., attached, coupled, fastened, connected, and joined) are to be construed broadly and can include intermediate structural elements between a collection of elements and relative movement between elements unless otherwise indicated. As such, connection references do not necessarily infer that two elements are directly connected and in fixed relation to one another. The exemplary drawings are for purposes of illustration only and the dimensions, positions, order and relative sizes reflected in the drawings attached hereto can vary.

Figure 1:
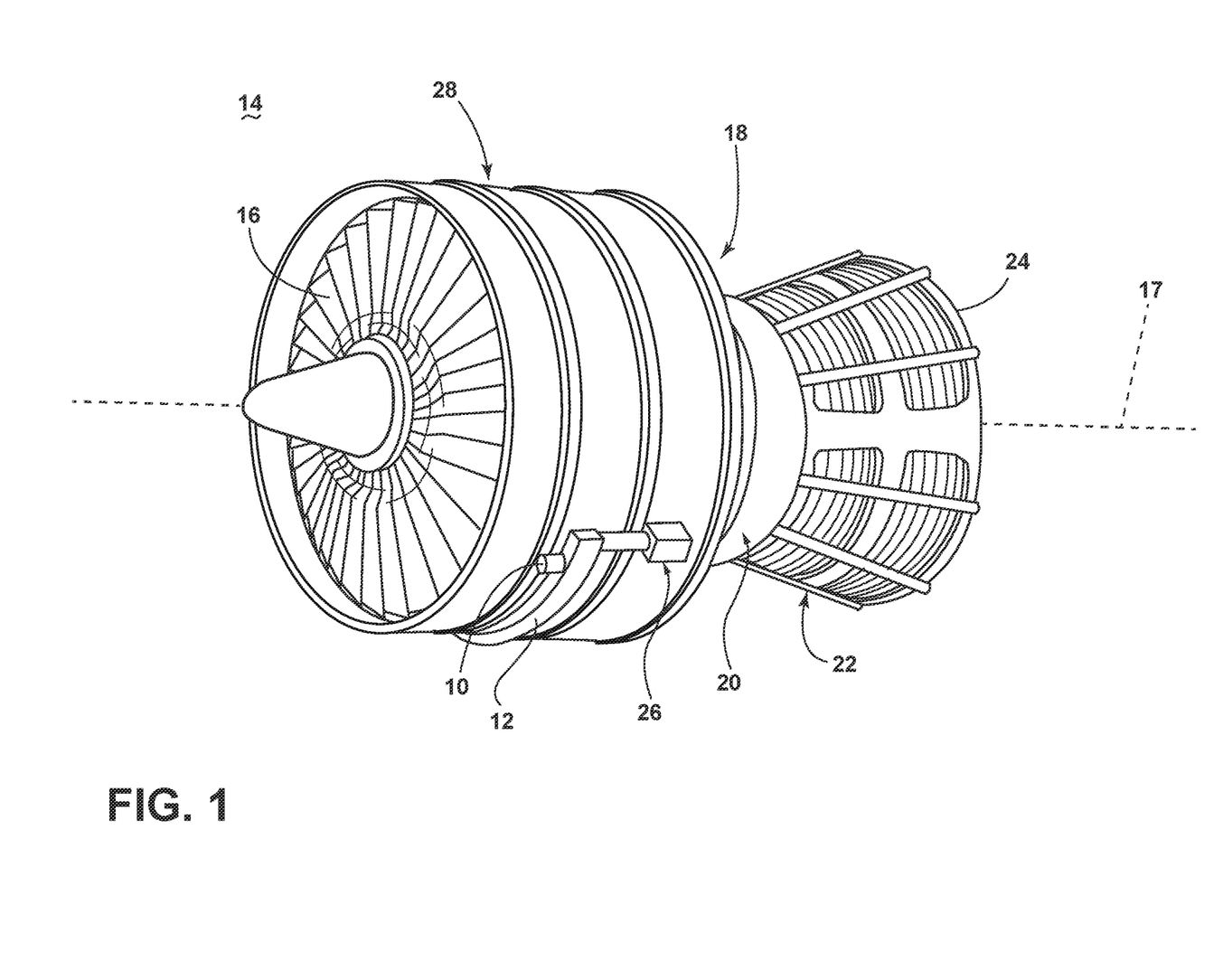
FIG. 1 is a schematic illustration of a gas turbine engine with an air turbine starter in accordance with various aspects described herein.

Referring to FIG. 1, an air turbine starter motor or air turbine starter (ATS) 10 is coupled to an accessory gear box (AGB) 12, also known as a transmission housing, and together are schematically illustrated as being mounted to a turbine engine 14, such as a gas turbine engine. The turbine engine 14 includes an air intake with a fan 16 that supplies air to a compression region having a high-pressure compression region 18. The fan 16 can define an engine axis of rotation 17. The air intake with the fan 16 and the compression region collectively are known as the 'cold section' of the turbine engine 14. The cold section is positioned upstream of a combustion section of the turbine engine 14. The high-pressure compression region 18 provides a combustion chamber 20 of the combustion section with high-pressure air. In the combustion chamber 20, the high-pressure air is mixed with fuel and combusted. The hot and pressurized combusted gas passes through a turbine region, illustrated as having a high-pressure turbine region 22 and a low-pressure turbine region 24 before exhausting from the turbine engine 14. As the pressurized gases pass through a high-pressure turbine (not shown) of the high-pressure turbine region 22 and a low-pressure turbine (not shown) of the low-pressure turbine region 24, the turbines extract kinetic energy from the flow of the gases passing through the turbine engine 14. The high-pressure turbine of the high-pressure turbine region 22 can be coupled to the compression mechanism (not shown) of the high-pressure compression region 18 by way of a shaft to power the compression mechanism. The low-pressure turbine can be coupled to the fan 16 of the air intake by way of a shaft to power the fan 16.

The AGB 12 can be coupled to the turbine engine 14 at one or more of the high-pressure or low-pressure compressor or turbine region 18, 22, 24. The coupling of the AGB 12 to the turbine engine 14 can be by way of a mechanical power take-off 26. The mechanical power take-off 26 contains multiple gears and means for mechanical coupling of the AGB 12 to the turbine engine 14. The mechanical power take-off 26 can translate power from the turbine engine 14 to the AGB 12 to power accessories of the aircraft, such as, but not limited to fuel pumps, electrical systems, and cabin environment controls.

The ATS 10 can be located radially outside of a fan casing 28. That is, the ATS 10 can be located radially outside of the air intake region containing the fan 16. Alternatively, it is contemplated that in a differing and non-limiting example, the ATS 10 can be located outside of the core near the high-pressure compression region 18, where the ATS 10 can be coupled to a transfer gear box (not shown) or an accessory gear box (not shown). Further, any location for the ATS 10 is contemplated where the ATS 10 can be coupled to the turbine engine 14.

Figure 2:
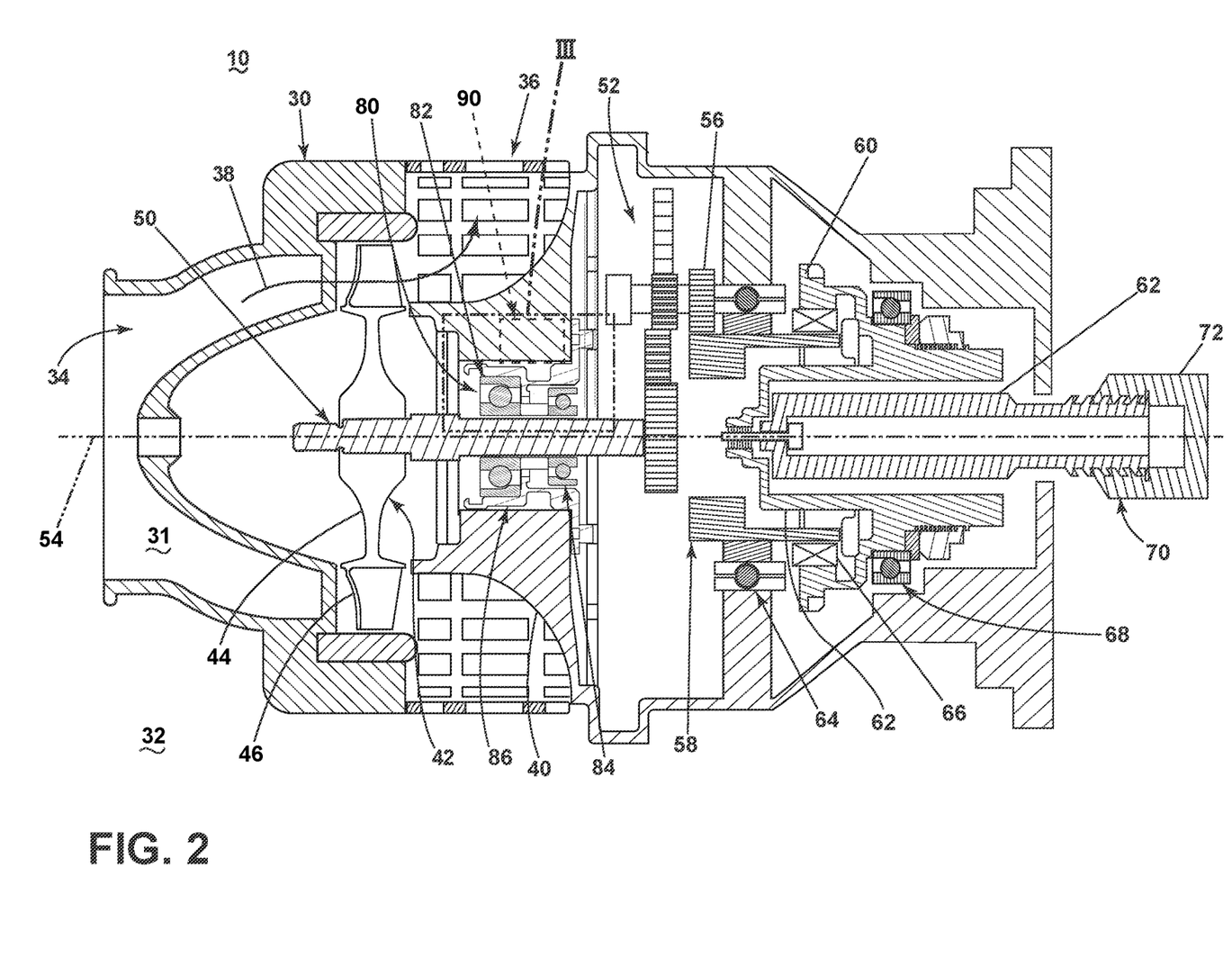
FIG. 2 is a sectional view of the air turbine starter of FIG. 1 with a bearing support structure, in accordance with an exemplary embodiment of the present disclosure.

FIG. 2 is a schematic cross section of an exemplary ATS 10 that can, for example, be included in FIG. 1. The ATS 10 includes a housing 30 defining an interior 31 and an exterior 32 of the housing 30. An inlet 34 and an outlet 36 are also defined by the housing 30. An air flow path 38 through the interior 31 is illustrated schematically with arrows. The air flow path 38 extends between the inlet 34 and the outlet 36 for communicating a flow of fluid, including, but not limited to gas, compressed air, or the like, therethrough. In one non-limiting example, the fluid is air, such as pressurized air, that is supplied from a pressurized air source, including but not limited to, a ground-operating air cart, an auxiliary power unit, or a cross-bleed start from an engine already operating. The housing 30 can be formed in any suitable manner including, but not limited to, that it can be made up of two or more parts that are joined or otherwise coupled together or can be integrally formed as a single piece.

As shown in FIG. 2, a seal 40 is coupled to or unitarily formed with the housing 30. It is contemplated that the seal 40 can divide the interior 31 into a dry portion and a wet portion. In the illustrated example, at least a portion of the seal 40 defines at least a portion of the air flow path 38. It is further contemplated that the seal 40 can be multiple portions coupled together to define one or more portions of the interior 31.

While illustrated as the seal 40 separating a "wet" portion of the ATS 10 from a "dry" portion of the housing, it is contemplated that the seal 40 does not have to perform as a seal and can be any portion of the housing 30 or structure coupled to the housing 30.

A turbine 42 is located within the interior 31 of the housing 30. At least a portion of the turbine 42 is disposed within the air flow path 38 for rotatably extracting mechanical power from the flow of gas along the air flow path 38. The turbine 42 includes a rotor portion 44 and a plurality of circumferentially spaced blades 46.

A drive shaft 50 is coupled to the rotating turbine 42 so that the drive shaft 50 can provide a rotational output. An output gear assembly 52 coupled to the drive shaft 50 allows for the transfer of mechanical power from the turbine 42 to the output gear assembly 52 via the rotational output of the drive shaft 50. The turbine 42, the drive shaft 50, and/or a portion of the output gear assembly 52 can rotate about an axis of rotation 54.

The output gear assembly 52 can include a gear train 56. A carrier member 58 can be drivingly coupled with the gear train 56. A driven member 60 can include a shaft 62 and be rotatably mounted to the carrier member 58. The carrier member 58 can be supported by carrier bearings 64.

A clutch 66 can be mounted to the carrier member 58. The driven member 60 is coupled to the clutch 66 and additionally supported by drive bearings 68. The driven member 60 is driven by the carrier member 58 which in turn is driven by the gear train 56 which in turn is driven by the turbine 42.

A decoupler assembly 70 can be disposed within at least a portion of the driven member 60. An output shaft 72 can be mounted to the shaft 62. The output shaft 72 is operably coupled to the turbine engine 14 (FIG. 1) such that the output shaft 72 can rotate a portion of the turbine engine 14. It is contemplated that the output shaft 72 is operably coupled to one or more portions of the compression region or the turbine region. That is, the output shaft 72 can rotate one or more portions of the compression region or the turbine region.

A bearing assembly 80 rotatably supports the drive shaft 50 and, thus, also rotatably supports the turbine 42. The bearing assembly 80 includes at least one bearing, illustrated as a first bearing 82 and a second bearing 84, a bearing support structure 86, and a fluid damping assembly 90. The bearing support structure 86 is radially located, at least in part, by way of example, between the seal 40 and the drive shaft 50. While illustrated as axially forward of the output gear assembly 52, the bearing assembly 80 can be located axially aft of the output gear assembly 52.

The bearing assembly 80 can be located anywhere in the ATS 10. It is contemplated, in a different and non-limiting example, that the carrier bearings 64 or the drive bearings 68 are part of one or more bearing assemblies similar to the bearing assembly 80, having at least one bearing, a bearing support structure, and a fluid damping assembly.

Figure 3:
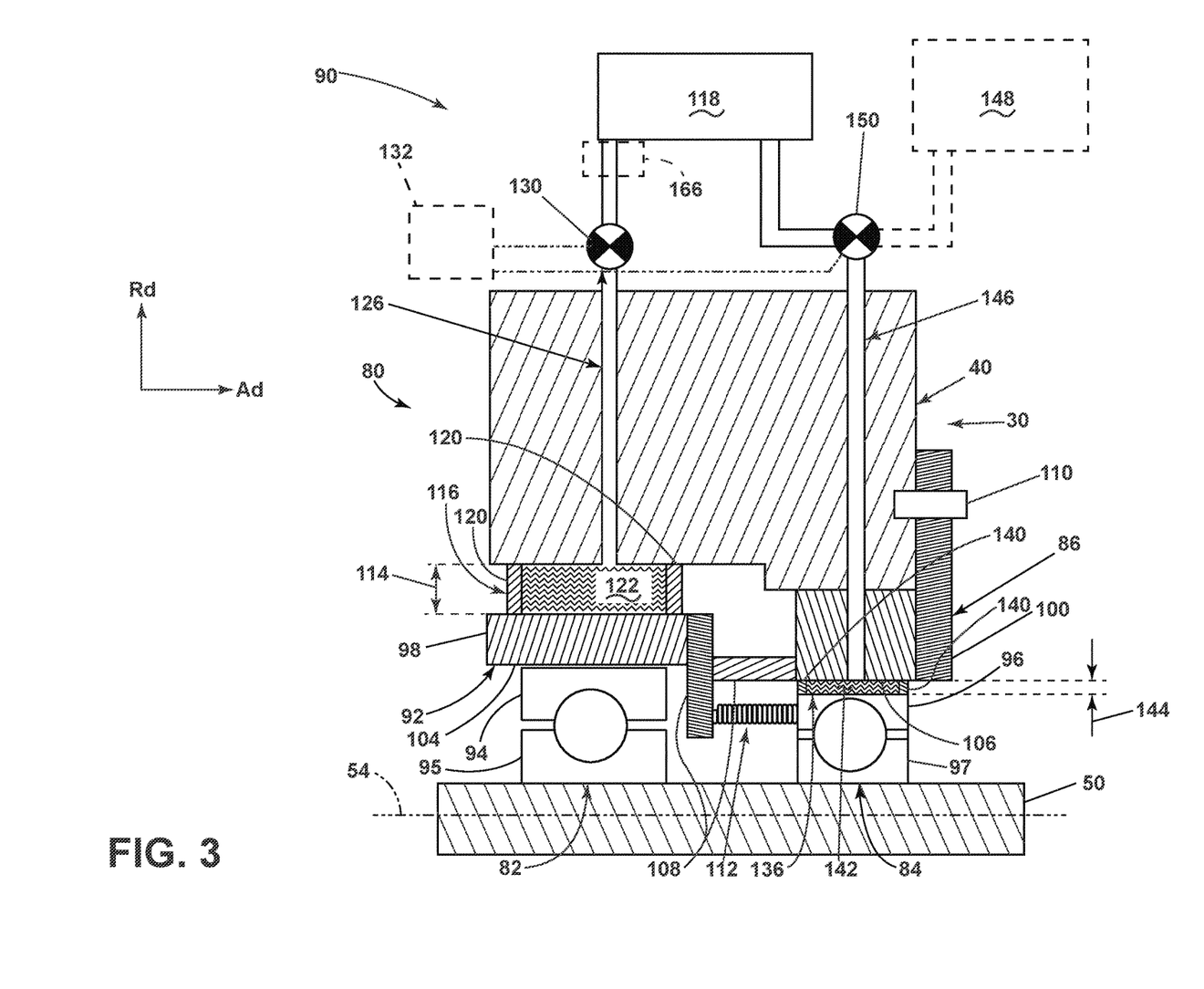
FIG. 3 is an enlarged cross-sectional view of the bearing support structure from FIG. 2 with a spring-finger structure, in accordance with an exemplary embodiment of the present disclosure.

FIG. 3 is an enlarged cross-sectional view of section III from FIG. 2 illustrating the bearing assembly 80. The first bearing 82 and the second bearing 84 can be ball bearings as illustrated, or any type of bearing including cylindrical roller bearings, tapered roller bearings and needle bearings. The first bearing 82 and the second bearing 84 can operate as parallel bearings. The first bearing 82 can be a thrust bearing or a primary load bearing, while the second bearing 84 can be a preload bearing that can maintain the ball angular load angle of the first bearing 82.

The bearing support structure 86 is a flexible bearing support structure that includes one or more flexible portions that absorb or dampen relative movement between the seal 40 or the housing 30 and the first bearing 82 or the second bearing 84. That is, one or more portions of the bearing support structure 86 can dissipate energy and/or transfer load. It is contemplated that the bearing support structure 86 can function like a shock absorber.

The bearing support structure 86 is illustrated, by way of example, as including a spring-finger structure 92 disposed between the seal 40 or the housing 30 and one or more of the first bearing 82 or the second bearing 84. More specifically, the spring-finger structure 92 is located between a portion of the seal 40 and a first outer race 94 of the first bearing 82 and a second outer race 96 of the second bearing 84.

The spring-finger structure 92 extends axially between a first end 98 and a second end 100. The spring-finger structure 92 includes a first bearing support 104 that receives or supports a portion of the first bearing 82 and a second bearing support 106 that receives or supports a portion of the second bearing 84.

The spring-finger structure 92 can include at least one flexible connector 108 to connect the first bearing support 104 to the second bearing support 106. The spring-finger structure 92 can be mounted to the seal 40 with any suitable fastener 110, such as, but not limited to, a bolt. The at least one flexible connector 108 can be formed from a shape memory alloy (denoted "SMA") material. It is further contemplated that the entire spring-finger structure 92 is formed from an SMA material.

A spring 112 or other known spacer or damping element can be disposed between the first bearing 82 and the second bearing 84. As illustrated, by way of example the spring 112 can extend between one of the flexible connectors 108 and the second outer race 96 of the second bearing 84. The spring 112 and the at least one flexible connector 108 contribute to the flexible movement of the spring-finger structure 92. The spring 112 can absorb or reduce the axial load on the second bearing 84, through at least preloading of the second outer race 96 of the second bearing 84.

A first inner race 95 of the first bearing 82 and a second inner race 97 of the second bearing 84 can rotatably support the drive shaft 50. The first bearing 82 and the second bearing 84 can be axially spaced with respect to the axis of rotation 54. The spring-finger structure 92 can include the first bearing support 104 and the second bearing support 106 for accommodating the first bearing 82 and the second bearing 84 respectively.

The first bearing support 104 and the second bearing support 106 of the spring-finger structure 92 can be formed to have two different axial/thrust (AT) load capabilities. The first bearing support 104 (and optionally surrounding structures) can be formed to have a first AT value (AT1) while the second bearing support 106 (and optionally surrounding structures) can be formed to have a second AT value (AT2) that is, for example, less than the value of AT1. In other words, the first bearing support 104 is more flexible in the axial direction than the second bearing support 106, as the first bearing support 104 has an AT value that is greater than the AT value of the second bearing support 106.

Likewise, the first bearing support 104 and the second bearing support 106 of the spring-finger structure 92 can be formed to have two different radial load/stiffness (K) capabilities. Stiffness (K) can be determined as the force applied to stretch, compress, or deflect an object, divided by the distance that the object gets longer, shorter, or deflects. For example, an object A having value lower K value than an object B indicates that object A is easier to stretch/compress or is less stiff than object B.

The first bearing support 104 (and optionally surrounding structures) can be formed to have a first K value (K1) while the second bearing support 106 (and optionally surrounding structures) can be formed to have a second K value (K2) that is, for example, greater than the value of K1. In other words, the first bearing support 104 can have a higher AT and a lower K than the second bearing support 106. Therefore, the spring-finger structure 92 can define a dual differential thrust rated bearing system where the second bearing 84 can be an "axial bearing" that is moveable or easier to flex in the axial direction (Ad) while the first bearing 82 can be a "radial bearing" that is moveable or easier to flex in the radial direction (Rd). It is further contemplated that the first bearing 82 is an axial bearing and the second bearing 84 is a radial bearing. In other words, the dual differential thrust rated bearing system has one bearing that is axially stiffer and radially softer while the other bearing is axially softer and radially stiffer.

To reduce radial loads on the first bearing 82, the first bearing support 104 has a low K value and is spaced from the seal 40 a distance 114. The fluid damping assembly 90 further reduces the radial load on the first bearing 82. The fluid damping assembly 90 can include a first fluid reservoir 116 and a fluid source 118.

The first fluid reservoir 116 is located between the first bearing support 104 and the seal 40. The first fluid reservoir 116 includes a portion of the first bearing support 104, a portion of the seal 40, and a fluid dam, illustrated as sidewalls 120 that define a first fluid cavity 122. The sidewalls 120 can be made of a flexible or shape memory material that allows for flexing or bending of the first bearing support 104 toward the seal 40. The sidewalls 120 can trap, seal, bind, or otherwise limit or restrict the flow of liquid from the first fluid cavity 122 to the region between the seal 40 and the spring-finger structure 92. The sidewalls 120 can include a material that is non-absorbing. Alternatively, in a different and non-limiting example, the sidewalls 120 can include a material that absorbs, for example, oil. The first fluid cavity 122 can be a variable volume cavity used to dampen the radial motion of the first bearing 82.

One or more of the sidewalls 120 can be located between or press fit between the first bearing support 104 and the seal 40. As used herein, the term "press fit" is an interference fit in which the coupling of two parts is achieved by normal force, friction, or cold welding. That is, prior to locating the sidewalls 120 between the seal 40 and the spring-finger structure 92, at least one dimension of the sidewalls 120 is greater than the distance 114 between the seal 40 and the spring-finger structure 92. It is contemplated that the sidewalls 120 can maintain oil volume in the first fluid cavity 122.

Alternatively, in another non-limiting example, the sidewalls 120 can couple to the first bearing support 104, the seal 40, or the first bearing support 104 and the seal 40. By way of non-limiting example, the sidewalls 120 or fluid dam can be a piston ring. Alternatively, in another different and non-limiting example, the sidewalls 120 can be a series of structures that limit the flow of fluid from the first fluid cavity 122 to the region between the first bearing support 104 and the seal 40. By way of non-limiting example, the series of structures can include one or more structures coupled to the first bearing support 104, the seal 40, or the first bearing support 104 and the seal 40.

The fluid source 118 is fluidly coupled to the first fluid reservoir 116 by one or more first conduits 126. The fluid source 118 can be journaled, housed within, defined, supported, or otherwise coupled to the seal 40 or housing 30 (FIG. 2).

A flow regulation device illustrated as a first valve 130 can control the volume or flow rate of fluid between the fluid source 118 and the first fluid reservoir 116. The flow regulation device illustrated as a first valve 130 can be coupled to or located within the one or more first conduits 126. Alternatively, in a different and non-limiting example, the first valve 130 can be located at an outlet of the fluid source 118.

The first valve 130 can be active (actively controlled) or powered. It is contemplated that the first valve 130 can be coupled to a controller and/or power source 132. Alternatively, in a different and non-limiting example, the first valve 130 can be passive, unpowered, and responsive to internal pressure. The first valve 130 can allow flow from the fluid source 118 to the first fluid reservoir 116 or allow flow from the first fluid reservoir 116 to the fluid source 118. While illustrated as located radially between the fluid source 118 and the first fluid reservoir 116, any location of the first valve 130 is contemplated, where the first valve 130 can control the flow of fluid between the fluid source 118 and the first fluid reservoir 116.

When the first bearing support 104 flexes in the radial direction (Rd) towards the seal 40, the distance 114 can decrease by 0% to 100%. More specifically, the distance 114 can decrease by 0% to 50%. Still more specifically, the distance 114 can decrease by 0% to 20%.

The spring 112 and material selected for the second bearing support 106 can absorb or reduce the axial load on the second bearing 84, through at least preloading of the spring-finger structure 92.

The fluid damping assembly 90 can include a second fluid reservoir 136. The second fluid reservoir 136 can be located between the second bearing support 106 and the second bearing 84. Alternatively, in a different and non-limiting example, the second fluid reservoir 136 can be located between the second bearing support 106 and the seal 40.

The second fluid reservoir 136 includes a portion of the second bearing support 106, a portion of the second bearing 84, and a fluid dam, illustrated as sidewalls 140 that define a second fluid cavity 142. The flexibility of the sidewalls 140 of the second fluid reservoir 136 can be similar to the sidewalls 120 of the first fluid reservoir 116. The sidewalls 140 of the second fluid reservoir 136 can be made of a flexible or shape memory material that allows for flexing or bending of the first bearing support 104 toward the seal 40. In a different and non-limiting example, the flexibility of the sidewalls 140 of the second fluid reservoir 136 can be different in the radial direction (Rd) than the sidewalls 120 of the first fluid reservoir 116. It is further contemplated that the sidewalls 140 of the second fluid reservoir 136 can have a flexibility in the axial direction Ad different than the sidewalls 120 of the first fluid reservoir 116.

The sidewalls 140 of the second fluid reservoir 136 can trap, seal, bind, or otherwise limit or restrict the flow of liquid from the second fluid cavity 142 to the region between the second bearing 84 and the spring-finger structure 92. One or more of the sidewalls 140 can be located between or press fit between the second bearing support 106 and the second bearing 84. The second fluid cavity 142 can be a variable volume cavity used to dampen the radial motion of the second bearing support 106 or the second bearing 84.

A second bearing distance 144 can be measured between the second outer race 96 of the second bearing 84 to the spring-finger structure 92. The second bearing distance 144 can be less than the distance 114 between the first bearing support 104 and the seal 40. The second bearing distance 144 can be between 5% and 50% of the distance 114 between the first bearing support 104 and the seal 40.

The fluid source 118 can be fluidly coupled to the second fluid reservoir 136 by one or more second conduits 146. Alternatively, in a different and non-limiting example, the second fluid reservoir 136 can be fluidly coupled via the second conduits 146 to another fluid source 148, separate and/or spaced from the fluid source 118.

A second valve 150 can control the volume or flow rate of fluid between the fluid source 118 or the other fluid source 148 and the second fluid reservoir 136. The flow regulation device illustrated as the second valve 150 can be coupled to or located within the one or more second conduits 146. Alternatively, in a different and non-limiting example, the second valve 150 can be located at an outlet of the fluid source 118 or another fluid source 148.

The second valve 150 can be active or powered. Optionally, it is contemplated that the second valve 150 can be coupled to the controller and/or power source 132. Alternatively, in a different and non-limiting example, the second valve 150 can be passive, unpowered, and responsive to internal pressure. The second valve 150 can allow the flow of fluid into or out of the second fluid cavity 142. The second valve 150 can allow the flow of fluid into or out of the second fluid cavity 142.

When the second bearing support 106 flexes in the radial direction (Rd) towards the seal 40, the second bearing distance 144 can decrease by 0% to 100%. More specifically, the second bearing distance 144 can decrease by 0% to 50%. Still more specifically, the second bearing distance 144 can decrease by 0% to 20%.

Flexibility in the radial direction (Rd) of the second fluid reservoir 136 can increase the capability or load bearing ability of the second bearing 84. Radial flexibility in the second bearing 84 results in an increase in radial flexibility of the first bearing 82. As the first bearing 82 is allowed to radially flex, the drive shaft 50 can apply a load or "push into" the second bearing 84. Therefore, an increase in flexibility of the second bearing 84 allows for a greater "push into" or load to be applied to the second bearing 84.

Although flexibility increases the radial load on the second bearing 84, the second fluid reservoir 136 (and optionally the material selected for the second bearing support 106) can dampen, dissipate, distribute, transfer, reduce the radial reaction, or otherwise reduce the radial load on the second bearing 84.

The second bearing support 106 is illustrated, by way of example, as in contact with the seal 40 and spaced from the second outer race 96 of the second bearing 84. However, it is contemplated in different and non-limiting examples that a gap can be located between the second bearing support 106 and the seal 40 or the second bearing support 106 can be in contact with at least a portion of the second outer race 96.

While illustrated as having a first bearing support and second bearing support, any number, including one, of bearing supports can be formed by the spring-finger structure 92.

Optionally, the fluid damping assembly 90 can include one or more flow control elements 166. While illustrated between the first valve 130 and the fluid source 118, it is contemplated that the one or more flow control elements 166 can be fluidly or operably coupled to any portion of the fluid damping assembly 90. The one or more flow control elements 166 can include, but are not limited to, one or more of a pump, a flow sensor, a pressure sensor, additional valves, filters, or bleed line.

In operation, during the start-up of the turbine engine 14 (FIG. 1) via the ATS 10 (FIG. 2), compressed air is provided at the inlet 34 (FIG. 2) of the ATS 10 (FIG. 2). The compressed air is directed by the seal 40 (FIG. 2) through the air flow path 38 (FIG. 2). The turbine 42 (FIG. 2) in the air flow path 38 rotates in response to the compressed air flow. The turbine 42 (FIG. 2) is operably coupled to the drive shaft 50, which provides rotational output that will result in starting the turbine engine 14 (FIG. 2). The drive shaft 50 is rotatably supported by the first bearing 82 and the second bearing 84.

During start-up, pressurized fluid such as, but not limited to, pressurized oil is provided to the first fluid reservoir 116, the second fluid reservoir 136, or both the first fluid reservoir 116 and the second fluid reservoir 136. The oil pressure and volume in the first fluid reservoir 116 or the second fluid reservoir 136 is controlled by the first valve 130 or the second valve 150, or both the first valve 130 and the second valve 150.

The axial, radial, or axial and radial forces or loads are dissipated or distributed with the spring-finger structure 92 which supports the first bearing 82 with the first bearing support 104 and the second bearing 84 with the second bearing support 106.

The axial load on the first bearing 82 can be absorbed by the first bearing support 104 and/or transferred to the seal 40 or the housing 30 by the at least one flexible connector 108.

The radial load on the first bearing 82 can be damped, dissipated, distributed, or otherwise reduced by the first bearing support 104 and/or the first fluid reservoir 116, as the first bearing support 104 deflects towards the seal 40. The first valve 130 controls the fluid flow between the first fluid reservoir 116 and the fluid source 118. Control of the fluid flow in and out of the first fluid reservoir 116 allows for control of the amount of radial flex or damping provided by the first fluid reservoir 116. Further, at least a portion of the radial load on the first bearing 82 can be transferred to the second bearing 84 by allowing radial flexibility of the first bearing 82.

The second bearing support 106 can absorb, distribute, transfer, or otherwise reduce the axial load on the second bearing 84. By way of non-limiting example, the spring 112 can absorb or reduce the axial load on the second bearing 84, through at least preloading of the second outer race 96 of the second bearing 84. The second bearing support 106 can be made of a material that can dissipate axial load and/or transfer the axial load on the second bearing 84 to one or more portions of the seal 40 or housing 30.

The increased radial load on the second bearing 84 (due to increased flexibility of the first bearing 82) can be damped by control of the second fluid reservoir 136.

The second valve 150 controls the fluid flow between the second fluid reservoir 136 and the fluid source 118 or another fluid source 148. Control of the fluid flow in and out of the second fluid reservoir 136 allows for control of the amount of radial flex or damping provided by the second fluid reservoir 136.

Further, in addition to the second fluid reservoir 136, portions of the radial load on the second bearing 84 can be transferred and/or dampened by the material chosen for the second bearing support 106.

Damping the axial and radial load or movement of the first bearing 82 and the second bearing 84 can lengthen the life of the ATS 10 and/or allow the drive shaft 50 to rotate at a higher speed. More specifically, increasing the radial load of the second bearing 84 decreases the radial load of the first bearing 82, improving the length of life of the first bearing 82. The increased radial load on the second bearing 84 is dampened, transferred, or otherwise reduced by at least the second fluid reservoir 136 to improve the length of life of the second bearing 84. That is, the increase in radial load is defused or offset by the second fluid reservoir 136 and/or the spring-finger structure 92.

Once the turbine engine 14 is started or self-sustaining, the clutch 66 can disconnect the shaft 62 from the carrier member 58. Further, once the turbine engine 14 has started, the pressurized fluid provided to the first fluid reservoir 116 or the second fluid reservoir 136 to enhance the damping of spring-finger structure 92 can stop or otherwise be allowed to reach an unpowered equilibrium.

In the event of a backdrive, the ATS 10 can be disconnected from the AGB 12 via the decoupler assembly 70.

Figure 4:
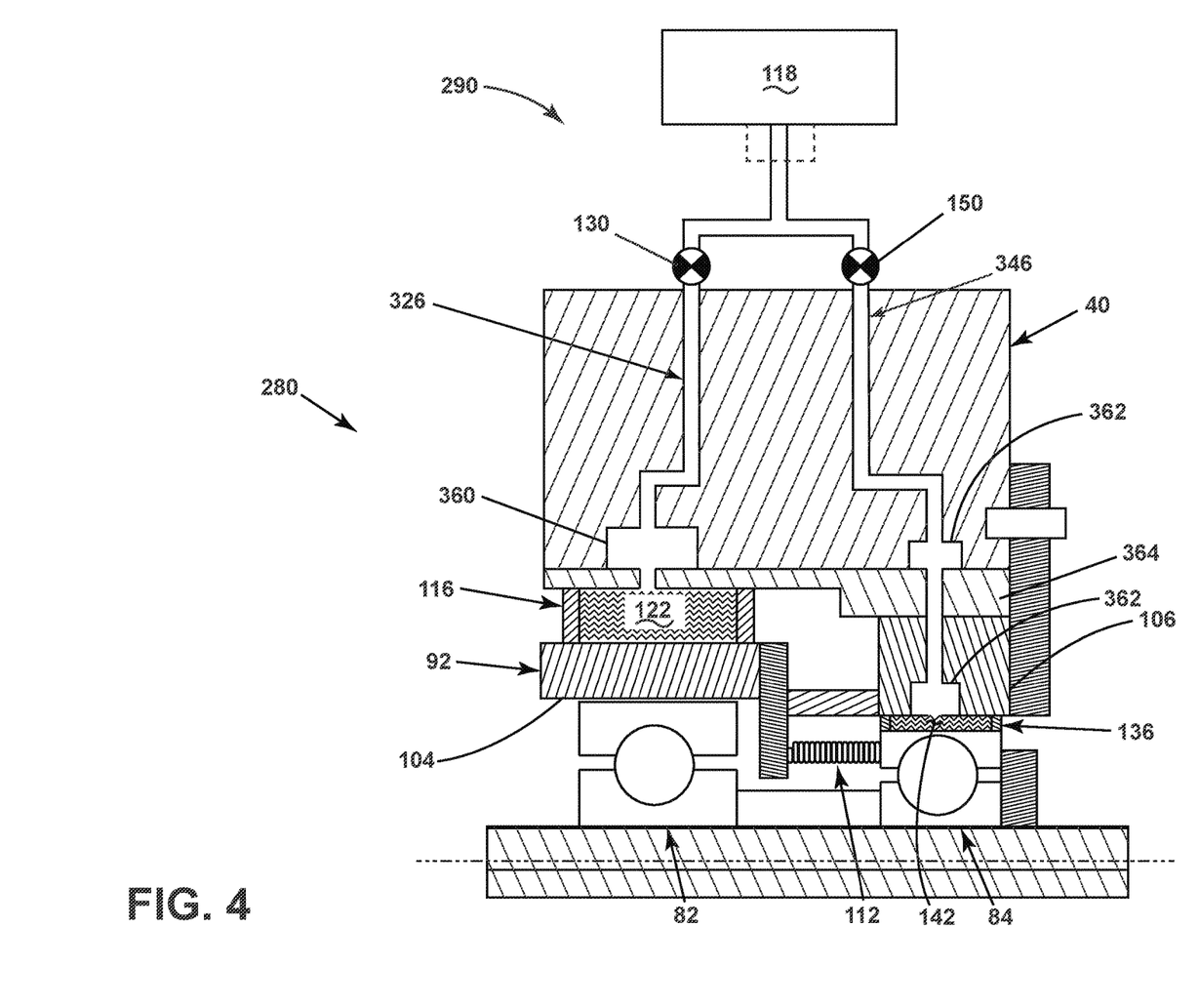
FIG. 4 is a variation of the bearing support structure of FIG. 3, in accordance with an exemplary embodiment of the present disclosure.

FIG. 4 illustrates a cross section of a bearing assembly 280 with a fluid damping assembly 290 similar to the bearing assembly 80 and the fluid damping assembly 90 of FIG. 3, therefore, like parts will be identified with like numerals increased by 200, with it being understood that the description of the like parts of bearing assembly 80 and the fluid damping assembly 90 applies to the bearing assembly 280 and the fluid damping assembly 290 unless otherwise noted.

The fluid damping assembly 290 can include the first fluid reservoir 116 located between the spring-finger structure 92 and the first bearing support 104, the second fluid reservoir 136 located between the second bearing 84 and the second bearing support 106, and at least one fluid source, illustrated as the fluid source 118. The fluid damping assembly 290 can further include auxiliary fluid reservoirs illustrated as a first auxiliary fluid reservoir 360 and a set of second auxiliary fluid reservoirs 362. The first auxiliary fluid reservoir 360 or the set of second auxiliary fluid reservoirs 362 can be coupled to the fluid source 118 by one or more first or second conduits 326, 346.

The first auxiliary fluid reservoir 360 can be journaled, housed within, defined, supported, or otherwise coupled to the seal 40 or housing 30 (FIG. 2). The first auxiliary fluid reservoir 360 is fluidly coupled between the fluid source 118 and the first fluid reservoir 116. The first auxiliary fluid reservoir 360 provides additional control of the pressurized fluid in the fluid damping assembly 290 that is between the fluid source 118 and the first fluid cavity 122. That is, instead of controlling flow or pressure with just the first valve 130, the flow or pressure can be controlled using the first valve 130 and the first auxiliary fluid reservoir 360. While other locations are contemplated, the first auxiliary fluid reservoir 360 can be located radially between the first valve 130 and the first fluid cavity 122.

The set of second auxiliary fluid reservoirs 362 can be journaled, housed within, defined, supported, or otherwise coupled to the seal 40 or housing 30 (FIG. 2). The set of second auxiliary fluid reservoirs 362 are fluidly coupled between the fluid source 118 and the second fluid reservoir 136. The set of second auxiliary fluid reservoirs 362 provides additional control of the pressurized fluid in the fluid damping assembly 290 that is between the fluid source 118 and the second fluid cavity 142. That is, instead of controlling flow or pressure with just the second valve 150, the flow or pressure can be controlled using the second valve 150 and the set of second auxiliary fluid reservoirs 362.

One or more support portions 364 can be coupled to or unitarily formed within the seal 40 that at least partially define the first auxiliary fluid reservoir 360 or one or more of the set of second auxiliary fluid reservoirs 362.

As illustrated, by way of example, one or more of the set of second auxiliary fluid reservoirs 362 can be defined by the second bearing support 106 of the spring-finger structure 92.

Benefits associated with the spring-finger structure and fluid damping assembly described herein allow for a longer life of the ATS bearing. Further, with the dissipating, damping, and otherwise controlling the axial and radial forces on the bearings equates with better lubrication which allows for more robust operations, such as allowing for faster rotation of the drive shaft.

The spring-finger structure combined with the fluid damping assembly provides reduced radial loads and axial loads on the bearings, which results in longer bearing life.

The flexibility provided by the finger structure combined with the fluid damping assembly allows for a decrease in the traditional radial load on the first bearing and an increase in radial load on the second bearing. Aspects such as the second fluid reservoir and/or the second bearing support can defuse, transfer, or otherwise reduce any increase in the radial load of the second bearing.

Further, the fluid damping assembly, having the first fluid reservoir and the second fluid reservoir, can provide differential damping to each of the two bearings. That is, the flow rate, volume, or pressure of the fluid/oil provided to the first fluid cavity is independently controlled from the flow rate, volume, or pressure of the fluid/oil provided to the second fluid cavity.

To the extent not already described, the different features and structures of the various embodiments can be used in combination, or in substitution with each other as desired. That one feature is not illustrated in all of the embodiments is not meant to be construed that it cannot be so illustrated, but is done for brevity of description. Thus, the various features of the different embodiments can be mixed and matched as desired to form new embodiments, whether or not the new embodiments are expressly described. All combinations or permutations of features described herein are covered by this disclosure.

This written description uses examples to describe aspects of the disclosure described herein, including the best mode, and also to enable any person skilled in the art to practice aspects of the disclosure, including making and using any devices or circuits and performing any incorporated methods. The patentable scope of aspects of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

Further aspects are provided by the subject matter of the following clauses:

An air turbine starter for starting an engine, comprising a housing having an inlet, an outlet, and an air flow path extending between the and the outlet, wherein the housing includes a seal that defines at least a portion of the air flow path, a drive shaft rotatably coupled to a turbine defining an axis of rotation and having circumferentially spaced blades at least partially disposed within the air flow path, at least one bearing rotatably supporting the drive shaft, a bearing support structure located, at least in part, between the at least one bearing and the seal, and a fluid damping assembly comprising one or more conduits that fluidly couple a fluid source to a fluid reservoir, wherein the fluid reservoir includes a fluid cavity at least partially defined by a portion of the bearing support structure.

The air turbine starter of any preceding clause, wherein the fluid damping assembly further comprises a flow regulation device coupled to or located within the one or more conduits.

The air turbine starter of any preceding clause, wherein the flow regulation device is a valve coupled to a controller or a power source.

The air turbine starter of any preceding clause, wherein the flow regulation device is a passive valve.

The air turbine starter of any preceding clause, wherein the flow regulation device is located radially between the fluid source and the fluid reservoir.

The air turbine starter of any preceding clause, wherein the flow regulation device provides pressurized fluid to the fluid reservoir.

The air turbine starter of any preceding clause, wherein the pressurized fluid is pressurized oil.

The air turbine starter of any preceding clause, wherein the fluid source provides pressurized fluid to the fluid reservoir.

The air turbine starter of any preceding clause, wherein the pressurized fluid is pressurized oil.

The air turbine starter of any preceding clause, wherein the fluid cavity is defined by the portion of the bearing support structure, a portion of the seal, and sidewalls.

The air turbine starter of any preceding clause, wherein the sidewalls are press fit between the bearing support structure and the portion of the seal.

The air turbine starter of claim 8, further comprising an auxiliary fluid reservoir fluidly connected to and located radially between the fluid source and the fluid reservoir.

The air turbine starter of any preceding clause, wherein the auxiliary fluid reservoir is a set of auxiliary fluid reservoirs located radially between the fluid source and the fluid reservoir, wherein each reservoir of the set of auxiliary fluid reservoirs is radially spaced from another reservoir of the set of auxiliary fluid reservoirs.

The air turbine starter of any preceding clause, wherein the bearing is a first bearing, the air turbine starting including a second bearing, and the bearing support structure includes a first bearing support adjacent the first bearing and a second bearing support adjacent the second bearing.

The air turbine starter of any preceding clause, wherein the bearing support structure includes a spring-finger structure defined by the first bearing support, the second bearing support, and at least one flexible connector.

The air turbine starter of any preceding clause, wherein a spring is axially located between one of the at least one flexible connector and the second bearing.

The air turbine starter of any preceding clause, wherein the fluid reservoir of the fluid damping assembly is a first fluid reservoir, the fluid damping assembly including a second fluid reservoir, wherein the first fluid reservoir located between the first bearing support and the seal, and the second fluid reservoir axially spaced from the first fluid reservoir and located between the second bearing support and the portion of the second bearing.

The air turbine starter of any preceding clause, further comprising a first valve and a second valve, wherein the first valve is located between the fluid source and the first fluid reservoir, and the second valve is located between the fluid source and the second fluid reservoir.

The air turbine starter of any preceding clause, further comprising one or more of a pump, a flow sensor, a pressure sensor, a valve, a filter, or a bleed line.

The air turbine starter of any preceding clause, wherein the fluid cavity is defined by the portion of the bearing support structure, a portion of the bearing, and sidewalls.

The air turbine starter of any preceding clause, wherein the sidewalls are press fit between the portion of the bearing support structure and the portion of the bearing.

The air turbine starter of any preceding clause, further comprising an auxiliary fluid reservoir fluidly connected to and located radially between a valve located in the one or more conduits and the fluid reservoir.

The air turbine starter of any preceding clause, wherein the fluid reservoir defines a fluid cavity that is a variable volume cavity that dampens the radial motion of the bearing.

The air turbine starter of any preceding clause, wherein the fluid reservoir defines a fluid cavity that is a variable volume cavity that dampens the radial motion of the bearing support structure.

The air turbine starter of any preceding clause, wherein the first fluid reservoir defines a first fluid cavity that is a variable volume cavity that dampens the radial motion of the first bearing, and the second fluid reservoir defines a second fluid cavity that is a variable volume cavity that dampens the radial motion of the second bearing support structure.

The air turbine starter of any preceding clause, wherein the set of flexible connectors define a load path between the first bearing support and the second bearing support.

The air turbine starter of any preceding clause, wherein the first bearing and the second bearing are axially spaced with respect to the rotating axis.

The air turbine starter of any preceding clause, wherein the first or second bearing is a radial bearing and the second or first bearing is an axial bearing.

What is claimed is:

1. An air turbine starter for starting an engine, comprising:
   a housing having an inlet, an outlet, and an air flow path extending between the inlet and the outlet, wherein the housing includes a seal that defines at least a portion of the air flow path;
   a drive shaft rotatably coupled to a turbine defining an axis of rotation, the turbine having circumferentially spaced blades at least partially disposed within the air flow path;
   a first bearing and a second bearing rotatably supporting the drive shaft;
   a bearing support structure located, at least in part, between the first and second bearings and the seal, the bearing support structure comprising:
   a first bearing support structure located between the first bearing and the seal;
   a second bearing support structure located between the second bearing and the seal; and
   at least one flexible connector coupling the first bearing support structure to the second bearing support structure;
   a fluid damping assembly comprising one or more conduits that fluidly couple a fluid source to a fluid reservoir, wherein the fluid reservoir includes a fluid cavity at least partially defined by a portion of the bearing support structure; and
   an output shaft operably coupled to the turbine by an output gear assembly, wherein the output shaft is selectively operably coupled to the engine, to rotate a portion of the engine.

2. The air turbine starter of claim 1, wherein the fluid damping assembly further comprises a valve coupled to or located within the one or more conduits.

3. The air turbine starter of claim 2, wherein the valve is coupled to a controller or a power source.

4. The air turbine starter of claim 2, wherein the valve is located radially between the fluid source and the fluid reservoir.

5. The air turbine starter of claim 2, wherein the valve provides pressurized fluid to the fluid reservoir.

6. The air turbine starter of claim 1, wherein the fluid source provides pressurized fluid to the fluid reservoir.

7. The air turbine starter of claim 6, wherein the pressurized fluid is pressurized oil.

8. The air turbine starter of claim 1, wherein the fluid cavity is at least partially defined by the portion of the bearing support structure and sidewalls.

9. The air turbine starter of claim 8, wherein the sidewalls are press fit between the bearing support structure and the portion of the seal.

10. The air turbine starter of claim 8, further comprising an auxiliary fluid reservoir fluidly connected to and located radially between the fluid source and the fluid reservoir.

11. The air turbine starter of claim 10, wherein the auxiliary fluid reservoir is a set of auxiliary fluid reservoirs, wherein at least one auxiliary fluid reservoir is located radially between the fluid source and the fluid reservoir, wherein each reservoir of the set of auxiliary fluid reservoirs is radially spaced from another reservoir of the set of auxiliary fluid reservoirs.

12. The air turbine starter of claim 1, wherein the bearing support structure includes a spring-finger structure defined by the first bearing support structure, the second bearing support structure, and the at least one flexible connector.

13. The air turbine starter of claim 12, wherein a spring is axially located between one of the at least one flexible connector and the second bearing.

14. The air turbine starter of claim 12, wherein the fluid reservoir of the fluid damping assembly is a first fluid reservoir, the fluid damping assembly including a second fluid reservoir, wherein the first fluid reservoir is located between the first bearing support and the seal, and the second fluid reservoir is axially spaced from the first fluid reservoir and located between the second bearing support and a portion of the second bearing.

15. The air turbine starter of claim 14, further comprising a first valve and a second valve, wherein the first valve is located between the fluid source and the first fluid reservoir, and the second valve is located between the fluid source and the second fluid reservoir.

16. The air turbine starter of claim 15, further comprising one or more of a pump, a flow sensor, a pressure sensor, a filter, or a bleed line.

17. The air turbine starter of claim 1, wherein the fluid cavity is defined by the portion of the bearing support structure, a portion of the second bearing, and sidewalls.

18. The air turbine starter of claim 17, wherein the sidewalls are press fit between the portion of the bearing support structure and the portion of the second bearing.

19. The air turbine starter of claim 17, further comprising an auxiliary fluid reservoir fluidly connected to and located radially between a valve located in the one or more conduits and the fluid reservoir.

\* \* \* \* \*